US008912790B2

(12) United States Patent
Lu et al.

(10) Patent No.: US 8,912,790 B2
(45) Date of Patent: Dec. 16, 2014

(54) MEASURING DEVICE FOR MEASURING FILM THICKNESS OF SILICON WAFER

(75) Inventors: Xinchun Lu, Beijing (CN); Pan Shen, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 13/387,849

(22) PCT Filed: Jun. 9, 2011

(86) PCT No.: PCT/CN2011/075513
§ 371 (c)(1),
(2), (4) Date: Jan. 30, 2012

(87) PCT Pub. No.: WO2012/122749
PCT Pub. Date: Sep. 20, 2012

(65) Prior Publication Data
US 2014/0002062 A1    Jan. 2, 2014

(30) Foreign Application Priority Data

Mar. 15, 2011 (CN) .......................... 2011 1 0062594

(51) Int. Cl.
*G01P 3/68* (2006.01)
*G01B 7/06* (2006.01)

(52) U.S. Cl.
CPC ... G01B 7/10 (2013.01); G01P 3/68 (2013.01); G01B 7/105 (2013.01)
USPC .......... 324/207.13; 324/228; 324/231; 451/5; 451/8; 451/11

(58) Field of Classification Search
USPC ............... 324/207, 164, 173, 225–231; 451/8
See application file for complete search history.

(56) References Cited

U.S. PATENT DOCUMENTS

| 6,326,777 | B2 * | 12/2001 | Penny | 324/164 |
| 7,777,483 | B2 * | 8/2010 | Lei et al. | 324/230 |
| 8,284,560 | B2 * | 10/2012 | Iravani et al. | 361/760 |
| 2005/0083048 | A1 * | 4/2005 | Lei et al. | 324/229 |
| 2010/0120333 | A1 * | 5/2010 | Sin et al. | 451/5 |

\* cited by examiner

*Primary Examiner* — Arleen M Vazquez
*Assistant Examiner* — Neel Shah
(74) *Attorney, Agent, or Firm* — Perkins Coie LLP

(57) ABSTRACT

A measuring device for measuring a film thickness of a silicon wafer (1) comprises: position and velocity sensors (4) linearly arranged along a longitudinal direction into first and second position and velocity sensor arrays spaced apart from each other in a lateral direction, in which the position and velocity sensors (4) in the first position and velocity sensor array are in one-to-one correspondence with the position and velocity sensors (4) in the second position and velocity sensor array in the lateral direction; an eddy current sensor (2) disposed in a symmetrical plane between the first position and velocity sensor array and the second position and velocity sensor array and perpendicular to the lateral direction; and a controller connected to the position and velocity sensors (4) and the eddy current sensor (2) respectively for controlling measurement of the thickness of the film according to detection signals from the position and velocity sensors (4) and the eddy current sensor (2).

17 Claims, 1 Drawing Sheet

MEASURING DEVICE FOR MEASURING FILM THICKNESS OF SILICON WAFER

This U.S. application claims priority under 35 U.S.C. 371 to, and is a U.S. National Phase application of, the International Patent Application No. PCT/CN2011/075513, filed Jun. 9, 2011, which claims the benefit of prior Chinese Application No. 201110062594.5 filed Mar. 15, 2011. The entire contents of the before-mentioned patent applications are incorporated by reference as part of the disclosure of this U.S. application.

FIELD

The present disclosure relates to a measuring device, and more particularly to a measuring device for measuring a film thickness of a silicon wafer.

BACKGROUND

With an increasing of a device density of a very large scale integrated circuit and a scaling down of a feature size thereof, copper wiring and copper interconnection technologies are currently used for chip fabrication. Generally, at least four times of copper film deposition and a chemical mechanical polishing (CMP) process are required to fabricate a chip. A CMP process control requires extremely accurate and stable measurements of film thickness and morphology, and is an important step affecting the yield.

In order to optimize CMP process parameters, increase a CMP yield and improve a planarization effect, it is very important to obtain a global and accurate film thickness of a silicon wafer. Different process parameters may be used in CMP in accordance with different points or regions having different film thicknesses on the silicon wafer so as to achieve a global silicon wafer planarization and a good silicon wafer polishing uniformity. Moreover, different polishing process parameters may be used in CMP in accordance with different silicon wafers having different film thicknesses so as to ensure the polishing uniformity between different silicon wafers. Thus, accurate measurement of film thicknesses of various points on the silicon wafer is very important.

SUMMARY

The present disclosure is directed to solve at least one of problems existing in the prior art. Therefore, an object of the present disclosure is to provide a measuring device for measuring a global film thickness of a silicon wafer.

In order to achieve the above object, an embodiment of the present disclosure provides a measuring device for measuring a film thickness of a silicon wafer. The measuring device comprises position and velocity sensors linearly arranged into first and second position and velocity sensor arrays along a longitudinal direction, in which the first and second position and velocity sensor arrays are spaced apart from each other in a lateral direction, the position and velocity sensors in the first position and velocity sensor array are in one-to-one correspondence with the position and velocity sensors in the second position and velocity sensor array in the lateral direction; an eddy current sensor disposed in a symmetrical plane perpendicular to the lateral direction, in which the first position and velocity sensor array is symmetrical with the second position and velocity sensor array about the symmetrical plane; and a controller coupled to the position and velocity sensors and the eddy current sensor respectively for controlling measurement of the film thickness according to detection signals from the position and velocity sensors and the eddy current sensor.

With the measuring device of according to an embodiment of the present disclosure, the thickness of the film on the silicon wafer is measured by the eddy current sensor, the velocity and the position of the silicon wafer is detected by the position and velocity sensors in real time, the point on the silicon wafer detected by the eddy current sensor is accurately positioned, and detection signals of the film thickness of the silicon wafer and the position and the velocity of the silicon wafer are fed back to the controller to form a closed loop control so as to realize an accurate global measurement of the film thickness of the silicon wafer.

In implementations, the following technical features may be included in the measuring device:

In one implementation, the measuring device can further include a distance measuring sensor disposed around the eddy current sensor and coupled to the controller, in which the controller calibrates the detection signal from the eddy current sensor using a detection signal from the distance measuring sensor. Therefore, the film thickness is more accurately measured.

In another implementation, a plurality of eddy current sensors are disposed in pairs in a vertical direction, adjacent magnetic poles of each pair of eddy current sensors are opposite to each other, and the distance measuring sensor is disposed adjacent to an upper eddy current sensor in a pair of the eddy current sensors. The opposite adjacent magnetic poles of each pair of eddy current sensors may enhance magnetism and accordingly may enhance intensity of detection signals from the eddy current sensors.

In another implementation, bottom surfaces of the distance measuring sensor and the eddy current sensor are positioned in a same horizontal plane.

In another implementation, projections of the eddy current sensor and two position and velocity sensors at proximal ends of the first and second position and velocity sensor arrays in a horizontal plane are on a same circumference.

In another implementation, the eddy current sensors, the eddy current sensor, the distance measuring sensor and the first and second position and velocity sensor arrays are parallel to each other and are in a same horizontal plane.

In another implementation, the position and velocity sensors are a proximity switch comprising a signal generator and a signal receiver which are disposed opposite to and spaced apart from each other in the vertical direction.

In another implementation, the proximity switch is a photoelectric proximity switch.

In another implementation, the distance measuring sensor is an ultrasonic distance measuring sensor, a laser distance measuring sensor or an infrared distance measuring sensor.

In yet another implementation, the measuring device further comprises a support, on which the position and velocity sensors, the distance measuring sensor and the eddy current sensor are mounted respectively. Therefore, the position and velocity sensors, the distance measuring sensor and the eddy current sensor may be disposed in a stable state, thus avoiding an influence of vibrations or movements of the above sensors upon an accuracy of the measuring result during the measuring process. Moreover, the measurement accuracy may be ensured by ensuring a manufacturing accuracy of the support.

Additional aspects and advantages of the embodiments of the present disclosure will be provided in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION OF EMBODIMENTS OF THE DISCLOSURE

Figure 1:
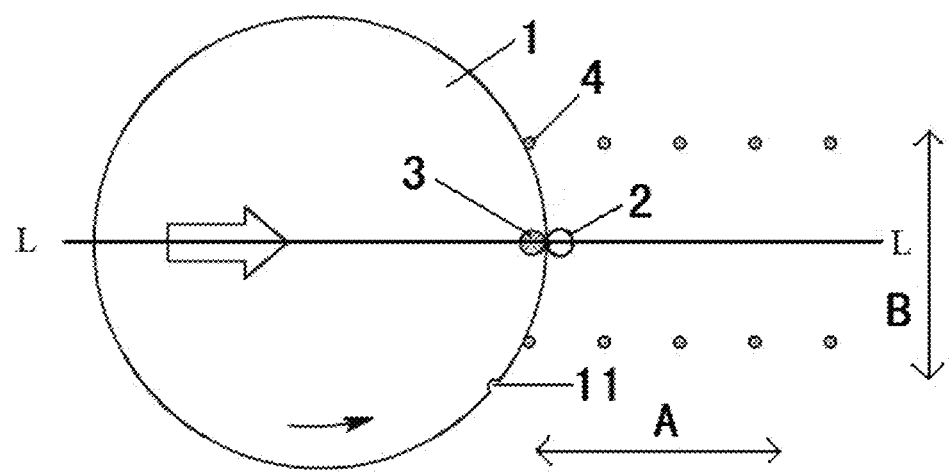
FIG. 1 is a top view of a measuring device for measuring a film thickness of a silicon wafer according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

In the description, relative terms such as "longitudinal", "lateral", "front", "rear", "right", "left", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In the description, terms concerning attachments, coupling and the like, such as "connected" and "interconnected", refer to a relationship wherein structures are secured or attached to one another through mechanical or electrical connection, or directly or indirectly through intervening structures, unless expressly described otherwise. Specific implications of the above phraseology and terminology may be understood by those skilled in the art according to specific situations.

Figure 2:
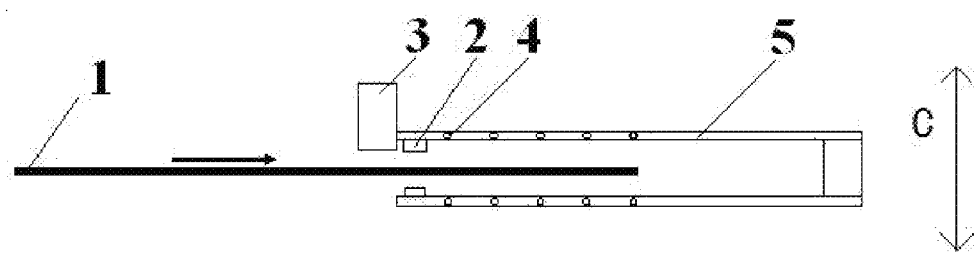
FIG. 2 is a front view of a measuring device for measuring a film thickness of a silicon wafer according to an embodiment of the present disclosure.

A measuring device for measuring a film thickness of a silicon wafer according to embodiments of the present disclosure will be described below with reference to FIG. 1 and FIG. 2. As shown in FIG. 1 and FIG. 2, the measuring device for measuring the film thickness of the silicon wafer according to an embodiment of the present disclosure comprises position and velocity sensors 4, an eddy current sensor 2 and a controller (not shown).

The position and velocity sensors 4 is linearly arranged into first and second position and velocity sensor arrays (upper and lower position and velocity sensor arrays, in FIG. 1) along a longitudinal direction A, and each of the first and second position and velocity sensor arrays has a plurality of position and velocity sensors 4.

The first and second position and velocity sensor arrays are spaced apart from each other in a lateral direction B (perpendicular to the longitudinal direction A) for measuring a translation speed and a rotation speed of a silicon wafer 1.

According to embodiments of the present disclosure, the distance between the first and second position and velocity sensor arrays in the lateral direction B may be adjusted according to practical applications without any limitation thereto.

The position and velocity sensors 4 in the first position and velocity sensor array are in one-to-one correspondence with those in the second position and velocity sensor array in the lateral direction B. Particularly, the first position and velocity sensor 4 in the first position and velocity sensor array from the left side (the proximal end) is in correspondence with the first position and velocity sensor 4 in the second position and velocity sensor array from the left side in the lateral direction B, and the second position and velocity sensor 4 in the first position and velocity sensor array from the left side is in correspondence with the second position and velocity sensor 4 in the second position and velocity sensor array from the left side in the lateral direction B. The rest may be deduced by analogy, and the last position and velocity sensor 4 (the position and velocity sensor on the rightmost side in FIG. 1) in the first position and velocity sensor array from the left side is in correspondence with the last position and velocity sensor 4 in the second position and velocity sensor array from the left side in the lateral direction B.

The eddy current sensor 2 is disposed in a symmetric plane perpendicular to the lateral direction B, in which the first position and velocity sensor array is symmetrical with the second position and velocity sensor array about the symmetrical plane, as shown in FIG. 1.

A projection of the eddy current sensor 2 in a horizontal plane is located on a longitudinal symmetrical center line L between projections of the first and second position and velocity sensor arrays in the horizontal plane. After the silicon wafer 1 passes below the eddy current sensor 2, the measurement of the film thickness on a predetermined point of the silicon wafer 1 is achieved.

The controller is coupled to the position and velocity sensors 4 and the eddy current sensor 2 respectively for controlling measurement of the film thickness according to detection signals from the position and velocity sensors 4 and the eddy current sensor 2.

Referring to FIG. 1 and FIG. 2, when the film thickness of the silicon wafer 1 is measured by using the measuring device according to an embodiment of the present disclosure, the center of the silicon wafer 1 is translated along a direction (the direction indicated by a hollow arrow in FIG. 1 or the direction indicated by a solid arrow in FIG. 2) of the longitudinal symmetrical center line L of the first and second position and velocity sensor arrays at a uniform translation velocity. The silicon wafer 1 is simultaneously rotated at a uniform rotation velocity while translated at the translation velocity. When translated to a position shown in FIG. 1, the silicon wafer 1 is detected by two position and velocity sensors 4 at the proximal ends (the leftmost sides) of the first and second position and velocity sensor arrays, and then the translation movement of the silicon wafer 1 is stopped. At this moment, projections of the two position and velocity sensors 4 at the leftmost sides of the first and second position and velocity sensor arrays in the horizontal plane are located on the circumference of the silicon wafer 1. A uniform rotation velocity of the silicon wafer 1 may be calculated by the time interval between a notch 11 of the silicon wafer 1 is detected by the two position and velocity sensors 4 on the left most sides of the first and second position and velocity sensor arrays in turn, and the angle between a line connecting the position and velocity sensors 4 on the leftmost side of the first position and velocity sensor array and the center of the silicon wafer 1 and the line connecting the position and velocity sensors 4 on the leftmost side of the second position and velocity sensor array and the center of the silicon wafer 1. Then, the silicon wafer 1 continues to translate at the uniform translation velocity, and a uniform translation velocity of the silicon wafer 1 may be calculated by the time interval between the silicon wafer 1 is detected by two adjacent position and velocity sensors 4 in a same position and velocity sensor array in turn, and the distance between the two adjacent position and velocity sensors 4. A trajectory and the position of the point on the silicon wafer 1 detected by the eddy current sensor 2 may be calculated according to the uniform translation velocity and the uniform rotation velocity of the silicon wafer 1.

With the measuring device of according to an embodiment of the present disclosure, the film thickness of the silicon wafer 1 is measured by the eddy current sensor 2, the velocity and the position of the silicon wafer 1 is detected by the position and velocity sensors 4 in real time, the point detected by the eddy current sensor 2 is accurately positioned, and detection signals of the film thickness of the silicon wafer 1 and the position and the velocity of the silicon wafer 1 are received by the controller from the eddy current sensor 2 and the position and velocity sensors 4 to form a closed loop control. The trajectory and the position of the point on the silicon wafer 1 detected by the eddy current sensor 2 may be accurately calculated by the controller according to the uniform rotation velocity and the uniform translation velocity of the silicon wafer 1 as well as a diameter of the silicon wafer 1. The trajectory of the detected point is a helix. The film thicknesses of most points on the silicon wafer 1 may be measured by the eddy current sensor 2 by adjusting the uniform rotation velocity and the uniform translation velocity of the silicon wafer 1 to realize an accurate global measurement of the film thickness of the silicon wafer 1. In other words, the measuring device according to an embodiment of the disclosure may measure the film thicknesses of the whole silicon wafer 1.

In some embodiments, the measuring device further comprises a distance measuring sensor 3 disposed around the eddy current sensor 2 and coupled to the controller so as to feed back the detection signals to the controller. The distance measuring sensor 3 is used for measuring the distance between the eddy current sensor 2 and the silicon wafer 1, and the distance between the distance measuring sensor 3 and the eddy current sensor 2 may be predetermined. For instance, the distance between the eddy current sensor 2 and the silicon wafer 1 is a sum of or a difference vale of the distance between the distance measuring sensor 3 and the silicon wafer 1 and the distance between the distance measuring sensor 3 and the eddy current sensor 2. The controller calibrates the detection signal from the eddy current sensor 2 using a detection signal from the distance measuring sensor 3.

In an embodiment, the bottom surface of the distance measuring sensor 3 and the bottom surface of the eddy current sensor 2 are in a same horizontal plane. In other words, the distance between the distance measuring sensor 3 and the eddy current sensor 2 is zero. Thus, a value measured by the distance measuring sensor 3 is the distance between the eddy current sensor 2 and the silicon wafer 1. In an embodiment, the distance measuring sensor 3 is an ultrasonic distance measuring sensor, a laser distance measuring sensor or an infrared distance measuring sensor.

In an embodiment, a plurality of eddy current sensors 2 are disposed in pairs in a vertical direction C, and adjacent magnetic poles of each pair of eddy current sensors are opposite to each other, that is, adjacent magnetic poles of an upper eddy current sensor 2 and a lower eddy current sensor 2 in the same pair in the vertical direction C are opposite, and the distance measuring sensor 3 is disposed adjacent to the upper eddy current sensor 2. The silicon wafer 1 passes between the upper eddy current sensor 2 and the lower eddy current sensor 2 during the measurement. The opposite adjacent magnetic poles of the upper eddy current sensor 2 and the lower eddy current sensor 2 may enhance magnetism and accordingly may enhance intensity of detection signals from the eddy current sensors 2. In an embodiment, the eddy current sensor 2 may be a known eddy current sensor.

In an embodiment, projections of the eddy current sensor 2 and two position and velocity sensors 4 at the proximal ends of the first and second position and velocity sensor arrays in the horizontal plane are on a same circumference which may has a same size as that of the silicon wafer 1. The proximal ends refer to ends (left ends in FIG. 1 and FIG. 2) of the first and second position and velocity sensor arrays firstly approaching the silicon wafer 1 when the film thickness of the silicon wafer 1 is measured using the measuring device according to an embodiment of the present disclosure. The silicon wafer 1 is disposed horizontally during the measurement so that the projections of the eddy current sensor 2 and the two position and velocity sensors 4 at proximal ends of the first and second position and velocity sensor arrays in the horizontal plane may be on the circumference of the silicon wafer 1. In actual measurement, the distance between the first position and velocity sensor array and the second position and velocity sensor array and the position of the eddy current sensor 2 may be determined according to the circumference of the silicon wafer 1 so that the projections of the eddy current sensor 2 and the two proximal position and velocity sensors 4 at proximal ends of the first and second position and velocity sensor arrays in the horizontal plane are on the circumference of the silicon wafer 1. Thus, a start measurement position of the silicon wafer 1 may be easily determined.

In an embodiment, the eddy current sensors 2, the distance measuring sensor 3 and the first and second position and velocity sensor arrays are parallel to each other and are in a same horizontal plane, so that the measurement is more convenient to perform.

Referring to FIG. 2, the position and velocity sensors 4 may be a proximity switch comprising a signal generator and a signal receiver which are disposed opposite to and spaced apart from each other in the vertical direction C. That is, the signal generator and the signal receiver are located in different horizontal planes. The signal generator and the signal receiver cooperate with each other for measuring the rotation velocity of the silicon wafer 1. In an embodiment, the proximity switch may be a photoelectric proximity switch.

In an embodiment, the measuring device further comprises a support 5, on which the position and velocity sensors 4, the distance measuring sensor 3 and the eddy current sensor 2 are mounted respectively. Therefore, the position and velocity sensors 4, the distance measuring sensor 3 and the eddy current sensor 2 may be disposed in a stable state, thus avoiding an influence of vibrations or movements of the above sensors upon an accuracy of the measuring result during the measuring process. Moreover, a mounting accuracy thereof may be ensured by a manufacturing of the support 5, and consequently the measurement accuracy may be ensured.

In an embodiment, the first and second position and velocity sensor arrays are parallel to each other and are in the same horizontal plane. The eddy current sensors 2 are simultaneously disposed right above and right below the longitudinal symmetrical center line of the first and second position and velocity sensor arrays in the vertical direction C respectively to form eddy current sensor pairs, and adjacent magnetic poles of each pair of eddy current sensors are opposite to each other. The distance measuring sensor 3 is disposed adjacent to the upper eddy current sensor 2 in the eddy current sensor pair, and the bottom surfaces of the distance measuring sensor 3 and the eddy current sensor 2 are in a same horizontal plane. Projections of the eddy current sensor 2 and the two position and velocity sensors 4 at proximal ends of the first and second position and velocity sensor arrays in the horizontal plane are on the same circumference. The eddy current sensor 2, the distance measuring sensor 3 and the position and velocity sensors 4 are mounted on the support 5 respectively.

A procedure for measuring the film thickness of the silicon wafer 1 using the measuring device according to an embodiment of the present disclosure will be described as follows.

Referring to FIG. 1 and FIG. 2, when the film thickness of the silicon wafer 1 is measured using the measuring device according to an embodiment of the present disclosure, the center of the silicon wafer 1 is translated along the direction (indicated by the hollow arrow in FIG. 1 or indicated by the solid arrow in FIG. 2) of the longitudinal symmetrical center line L of the first and second position and velocity sensor arrays at a uniform translation velocity. The silicon wafer 1 is also rotated at a uniform rotation velocity while translated at the uniform translation velocity.

The notch 11 of the silicon wafer 1 is used as a start point for the film thickness measurement. When translated to a position shown in FIG. 1, the silicon wafer 1 is detected by the two position and velocity sensors 4 on the leftmost sides (the proximal ends) of the first and second position and velocity sensor arrays, and then the translation movement of the silicon wafer 1 is stopped. Then, the notch 11 of the silicon wafer 1 is detected by the two position and velocity sensors 4 on the leftmost sides of the first and second position and velocity sensor arrays in turn. That is, the notch 11 is detected when passes through the two position and velocity sensors 4 in turn during the rotation of the silicon wafer 1. The rotation velocity of the silicon wafer is consequently obtained.

The rotation velocity of the silicon wafer 1 may be calculated according to a formula: $\omega=\theta/T$, in which $\omega$ is the rotation velocity of the silicon wafer 1, $\theta$ is the angle of a line connecting the position and velocity sensors 4 on the leftmost side of the first position and velocity sensor array and the center of the silicon wafer 1 and a line connecting the position and velocity sensors 4 on the leftmost side of the second position and velocity sensor array and the center of the silicon wafer 1, and T is a time interval between a notch 11 of the silicon wafer 1 is detected by the two position and velocity sensors 4 on the left most sides of the first and second position and velocity sensor arrays in turn. The calculated rotation velocity is fed back to the controller for detecting and controlling the rotation velocity of the silicon wafer 1 in real time.

After T/2 after the notch 11 is detected again, the silicon wafer 1 starts to be translated a the uniform translation velocity. Because the eddy current sensors 2 are simultaneously disposed right above the longitudinal symmetrical center line L of the first and second position and velocity sensor arrays in the vertical direction C, and projections of the eddy current sensor 2 and the two position and velocity sensors 4 at proximal ends of the first and second position and velocity sensor arrays in the horizontal plane are on the same circumference, so that, at this moment, the notch 11 of the silicon wafer 1 is just used as a start point for measuring the film thickness of the silicon wafer 1 by the eddy current sensor 2, and the distance between the eddy current sensor 2 and the silicon wafer 1 is measured by the distance measuring sensor 3.

The translation velocity of the silicon wafer 1 is measured by two adjacent position and velocity sensors 4 in the same position and velocity sensor array.

The translation velocity of the silicon wafer 1 may be calculated according to a formula: $v=l/T'$, in which v is the translation velocity of the silicon wafer 1, l is a distance between two adjacent position and velocity sensors 4 in the same position and velocity sensor array, and T' is a time interval between the silicon wafer 1 is detected by the two adjacent position and velocity sensors 4 in turn. The calculated translation velocity is fed back to the controller for detecting and controlling the translation velocity of the silicon wafer 1 in real time.

When a film thickness at the center of the silicon wafer 1 is measured by the eddy current sensor 2, the translation and rotation movements of the silicon wafer 1 are stopped and the measurement is terminated. Therefore, the film thicknesses of the whole silicon wafer 1 are obtained, and a global film thickness measurement is thus realized.

Reference throughout this specification to "an embodiment", "some embodiments", "an embodiment", "an example", "a specific examples", or "some examples" means that a particular feature, structure, material, or characteristic described in connection with the embodiment or example is included in at least an embodiment or example of the disclosure. Thus, the appearances of the phrases such as "in some embodiments", "in an embodiment", "in an embodiment", "an example", "a specific examples", or "some examples" in various places throughout this specification are not necessarily referring to the same embodiment or example of the disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance.

Although explanatory embodiments have been shown and described, it would be appreciated by those skilled in the art that changes, alternatives, and modifications all falling into the scope of the claims and their equivalents may be made in the embodiments without departing from spirit and principles of the disclosure.

What is claimed is:

1. A measuring device for measuring a film thickness of a silicon wafer, comprising:

position and velocity sensors linearly arranged into a first position and velocity sensor array of position and velocity sensors in a linear array and a second position and velocity sensor array of position and velocity sensors in another linear array parallel to the linear array of the first position and velocity sensor array, both being parallel to and along a longitudinal direction, in which the first and second position and velocity sensor arrays are within a common plane and are spaced apart from each other in a lateral direction perpendicular to the longitudinal direction, the position and velocity sensors in the first position and velocity sensor array are in one-to-one correspondence with the position and velocity sensors in the second position and velocity sensor array in the lateral direction;

an eddy current sensor disposed in a symmetrical plane perpendicular to the lateral direction and positioned at a middle position between the first position and velocity sensor array and the second position and velocity sensor array;

a controller coupled to the position and velocity sensors and the eddy current sensor respectively for controlling measurement of the film thickness according to detection signals from the position and velocity sensors and the eddy current sensor that are obtained when the silicon wafer is translated along the longitudinal direction while being rotated, wherein the controller and the first and second position and velocity sensor arrays collectively detect a rotation velocity of the silicon wafer based on a time delay in sensing a notch on the silicon wafer by (1) a first position and velocity sensor in the first position and velocity sensor array and (2) a second position and velocity sensor in the second position and velocity sensor array that corresponds the first position and velocity sensor at the same longitudinal position, and wherein the controller and the first and second position and velocity sensor arrays collectively detect a translation velocity of the silicon wafer along the longitudinal direction based on a time delay in sensing the silicon wafer by two adjacent position and velocity sensors along in the longitudinal direction in either the first or second position and velocity sensor array.

2. The measuring device according to claim 1, further comprising a distance measuring sensor disposed around the eddy current sensor and coupled to the controller, in which the controller calibrates the detection signal from the eddy current sensor using a detection signal from the distance measuring sensor.

3. The measuring device according to claim 2, wherein a plurality of eddy current sensors are disposed in pairs in a vertical direction, adjacent magnetic poles of each pair of eddy current sensors are opposite to each other, and the distance measuring sensor is disposed adjacent to an upper eddy current sensor in a pair of the eddy current sensors.

4. The measuring device according to claim 2, wherein bottom surfaces of the distance measuring sensor and the eddy current sensor are positioned in a same horizontal plane.

5. The measuring device according to claim 1, wherein projections of the eddy current sensor on a horizontal plane and two position and velocity sensors at proximal ends of the first and second position and velocity sensor arrays on the horizontal plane are located on a same circumference.

6. The measuring device according to claim 2, wherein the eddy current sensor, the distance measuring sensor and the first and second position and velocity sensor arrays are parallel to each other and are in a same horizontal plane.

7. The measuring device according to any of claim 1, wherein each of the position and velocity sensors is a proximity switch comprising a signal generator and a signal receiver which are disposed opposite to and spaced apart from each other in the vertical direction.

8. The measuring device according to claim 7, wherein the proximity switch is a photoelectric proximity switch.

9. The measuring device according to any of claim 1, wherein the distance measuring sensor is an ultrasonic distance measuring sensor, a laser distance measuring sensor or an infrared distance measuring sensor.

10. The measuring device according to any of claim 1, further comprising a support, on which the position and velocity sensors, the distance measuring sensor and the eddy current sensor are mounted respectively.

11. The measuring device according to claim 2, wherein the position and velocity sensors are a proximity switch comprising a signal generator and a signal receiver which are disposed opposite to and spaced apart from each other in the vertical direction.

12. The measuring device according to claim 9, wherein the proximity switch is a photoelectric proximity switch.

13. The measuring device according to claim 2, wherein the distance measuring sensor is an ultrasonic distance measuring sensor, a laser distance measuring sensor or an infrared distance measuring sensor.

14. The measuring device according to claim 2, further comprising a support, on which the position and velocity sensors, the distance measuring sensor and the eddy current sensor are mounted respectively.

15. A method for measuring a film thickness of a silicon wafer, comprising:

providing a first position and velocity sensor array of position and velocity sensors in a linear array and a second position and velocity sensor array of position and velocity sensors in another linear array parallel to the linear array of the first position and velocity sensor array, both being parallel to and along a longitudinal direction, in which the first and second position and velocity sensor arrays are within a common plane and are spaced apart from each other in a lateral direction perpendicular to the longitudinal direction, the position and velocity sensors in the first position and velocity sensor array are in an one-to-one correspondence with the position and velocity sensors in the second position and velocity sensor array in the lateral direction;

providing an eddy current sensor device positioned at a middle position between the first position and velocity sensor array and the second position and velocity sensor array;

directing the silicon wafer to move at a translation speed along the longitudinal direction towards to and into the first and position and velocity sensor arrays while rotating the silicon wafer;

using the first and second position and velocity sensor arrays to collectively detect a rotation velocity of the silicon wafer based on a time delay in sensing a notch on the silicon wafer by (1) a first position and velocity sensor in the first position and velocity sensor array and (2) a second position and velocity sensor in the second position and velocity sensor array that corresponds the first position and velocity sensor at the same longitudinal position;

determining a translation velocity of the silicon wafer along the longitudinal direction based on a time delay in sensing the silicon wafer by two adjacent position and velocity sensors along in the longitudinal direction in either the first or second position and velocity sensor array; and determining the film thickness of the silicon wafer based on detection signals from the position and velocity sensors of the first and second position and velocity sensor arrays and the eddy current sensor device.

16. The method as in claim 15, comprising using a pair of eddy current sensors on two sides of the silicon wafer as the eddy current sensor device.

17. The method as in claim 15, comprising using a single current sensor located on one side of the silicon wafer as the eddy current sensor device.

* * * * *